US012286906B1

(12) United States Patent
Snyder et al.

(10) Patent No.: US 12,286,906 B1
(45) Date of Patent: Apr. 29, 2025

(54) LOCATING PLATE FOR USE WITH TURBINE SHROUD ASSEMBLIES

(71) Applicant: Rolls-Royce Corporation, Indianapolis, IN (US)

(72) Inventors: Clark Snyder, Indianapolis, IN (US); David J. Thomas, Indianapolis, IN (US); Ted J. Freeman, Indianapolis, IN (US); Aaron D. Sippel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/528,729

(22) Filed: Dec. 4, 2023

(51) Int. Cl.
*F01D 9/04* (2006.01)
*F01D 17/16* (2006.01)
*F01D 25/24* (2006.01)

(52) U.S. Cl.
CPC ............... *F01D 9/04* (2013.01); *F01D 17/16* (2013.01); *F01D 25/24* (2013.01); *F05D 2220/32* (2013.01); *F05D 2240/12* (2013.01)

(58) Field of Classification Search
CPC . F01D 9/04; F01D 9/041; F01D 9/042; F01D 9/047; F01D 11/08-24; F01D 25/24; F05D 2240/128; F05D 2240/14
See application file for complete search history.

(56) References Cited

U.S. PATENT DOCUMENTS 5,232,340 A * 8/1993 Morgan .................. F01D 9/042 415/209.2
5,641,267 A * 6/1997 Proctor ................. F01D 25/246 415/173.1
7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 4/2014 Martin et al.
8,784,041 B2 7/2014 Durocher et al.
(Continued)

FOREIGN PATENT DOCUMENTS

EP 1965031 A2 9/2008
EP 3543468 A1 9/2019
FR 3056636 A1 3/2018

*Primary Examiner* — Christopher R Legendre
(74) *Attorney, Agent, or Firm* — Barnes & Thornburg

(57) ABSTRACT

A turbine assembly includes a turbine case, a vane assembly, and a locating plate. The vane assembly includes a first vane and an outer platform arranged on a radially outer end of the first vane, the outer platform including a first anti-rotation protrusion extending radially outwardly away from a radially outwardly-facing surface of the outer platform. The locating plate is radially outside of the vane assembly and includes a main wall and two anti-rotation extensions extending radially inwardly. The first anti-rotation protrusion of the vane assembly is arranged to engage with one of the anti-rotation extensions so as to block circumferential movement of the vane assembly relative to the locating plate.

20 Claims, 13 Drawing Sheets

(56) References Cited

U.S. PATENT DOCUMENTS

| | | | |
|---|---|---|---|
| 8,845,285 | B2 | 9/2014 | Weber et al. |
| 8,905,708 | B2 | 12/2014 | Weber et al. |
| 9,079,245 | B2 | 7/2015 | Durocher et al. |
| 9,534,500 | B2 | 1/2017 | Bouchard et al. |
| 9,708,922 | B1 | 7/2017 | Davis et al. |
| 9,714,580 | B2 | 7/2017 | Slavens et al. |
| 9,745,854 | B2 | 8/2017 | Baldiga et al. |
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 | 10/2019 | Sippel et al. |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,118,477 | B2 * | 9/2021 | Roussille .............. F01D 25/246 |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

LOCATING PLATE FOR USE WITH TURBINE SHROUD ASSEMBLIES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

According to a first aspect of the present disclosure, a turbine assembly for use with a gas turbine engine includes a turbine case arranged circumferentially around an axis, a vane assembly, and a locating plate. The vane assembly is arranged circumferentially at least partway around the axis and radially inwardly of the turbine case. The vane assembly includes a first vane and an outer platform arranged on a radially outer end of the first vane, the outer platform including a first anti-rotation protrusion extending radially outwardly away from a radially outwardly-facing surface of the outer platform.

The locating plate is arranged circumferentially at least partway around the axis and coupled with the turbine case radially outward of the vane assembly. The locating plate includes a main wall, a first anti-rotation extension extending radially inwardly away from an aft end of the main wall, and a second anti-rotation extension extending radially inwardly away from the aft end of the main wall and circumferentially spaced apart from the first anti-rotation extension.

In some embodiments, the first anti-rotation protrusion of the vane assembly is arranged to engage with one of the first anti-rotation extension and the second anti-rotation extension of the locating plate so as to block circumferential movement of the vane assembly relative to the locating plate.

In some embodiments, the locating plate extends partway circumferentially around the axis, the main wall includes a first circumferential side and second circumferential side circumferentially opposite the first circumferential side, and the aft end of the main wall extends between the first circumferential side and the second circumferential side.

In some embodiments, the vane assembly further includes a second anti-rotation protrusion circumferentially spaced apart from the first anti-rotation protrusion.

In some embodiments, the first anti-rotation extension includes a first extension surface that faces a first circumferential direction and the first anti-rotation protrusion includes a first protrusion surface that faces a second circumferential direction opposite the first circumferential direction, and the first extension surface is configured to contact the first protrusion surface so as to block circumferential movement of the vane assembly relative to the locating plate in response to circumferential forces acting on the vane assembly.

In some embodiments, the second anti-rotation extension includes a second extension surface that faces the second circumferential direction and the second anti-rotation protrusion includes a second protrusion surface that faces the first circumferential direction, and the second extension surface is configured to contact the second protrusion surface so as to further block circumferential movement of the vane assembly relative to the locating plate in response to circumferential forces acting on the vane assembly.

In some embodiments, the first extension surface faces away from the second extension surface and the first protrusion surface faces the second protrusion surface.

In some embodiments, the outer platform of the vane assembly includes a main platform and a first flange extending radially outwardly from an aft end of the main platform, and the first and second anti-rotation protrusions are arranged on the first flange.

In some embodiments, the turbine assembly further includes a turbine shroud assembly coupled with the turbine case to define a portion of a gas path of the turbine assembly, the turbine shroud assembly including a carrier segment and a blade track segment, the carrier segment being made of metallic materials and arranged circumferentially at least partway around the axis, the carrier segment including an outer wall and a hanger extending from the outer wall and supported on the turbine case to couple the carrier segment to the turbine case. In some embodiments, the locating plate is arranged axially forward of the carrier segment to block axially forward movement of the carrier segment and prevent separation of the hanger from the turbine case.

In some embodiments, the carrier segment further includes an anti-rotation platform extending axially away from a forward-facing surface of the outer wall, the locating plate further includes an anti-rotation recess formed in the main wall of the locating plate, and the anti-rotation recess is configured to receive the anti-rotation platform to block axially forward movement of the carrier segment and prevent separation of the hanger from the turbine case.

In some embodiments, the anti-rotation recess is defined by an axially forward wall, a first circumferential wall, and a second circumferential wall opposite the first circumferential wall, and a first circumferential end of the anti-rotation platform of the carrier segment and a second circumferential end of the anti-rotation platform opposite the first circumferential end are configured to engage with the first and second circumferential walls, respectively, so as to block circumferential movement of the carrier segment relative to the locating plate.

In some embodiments, the anti-rotation recess further includes a first peg extending radially upwardly from a bottom surface of the anti-rotation recess, the anti-rotation platform includes a first slot formed therein, and the first peg is arranged within the first slot so as to secure the anti-rotation platform within the anti-rotation recess.

In some embodiments, the first slot includes a stadium shape and includes a length that is greater than a diameter of the first peg and a width that is generally equal to the diameter of the first peg so as to allow for circumferential movement of the first peg within the first slot and not allow for axial movement of the first peg within the first slot.

According to a further aspect of the present disclosure, a turbine assembly for use with a gas turbine engine includes a turbine case arranged circumferentially around an axis, a vane assembly, and a locating plate. The vane assembly is arranged radially inwardly of the turbine case and includes a first vane and an outer platform having a first anti-rotation protrusion extending radially outwardly away from a radially outwardly-facing surface of the outer platform. The locating plate is coupled with the turbine case radially outward of the vane assembly, the locating plate including a main wall, a first anti-rotation extension extending radially inwardly away from an aft end of the main wall. In some embodiments, the first anti-rotation protrusion of the vane assembly is arranged to engage with the first anti-rotation extension of the locating plate so as to block circumferential movement of the vane assembly relative to the locating plate.

In some embodiments, the locating plate further includes a second anti-rotation extension extending radially inwardly away from the aft end of the main wall and circumferentially spaced apart from the first anti-rotation extension, the vane assembly further includes a second anti-rotation protrusion circumferentially spaced apart from the first anti-rotation protrusion, and the second anti-rotation protrusion of the vane assembly is arranged to engage with the second anti-rotation extension of the locating plate so as to further block circumferential movement of the vane assembly relative to the locating plate.

In some embodiments, the outer platform of the vane assembly includes a main platform and a first flange extending radially outwardly from an aft end of the main platform, and the first and second anti-rotation protrusions are arranged on the first flange.

In some embodiments, the turbine assembly further includes a turbine shroud assembly coupled with the turbine case and including a carrier segment and a blade track segment, the carrier segment including an outer wall and a hanger extending from the outer wall and supported on the turbine case to couple the carrier segment to the turbine case. In some embodiments, the locating plate is arranged axially forward of the carrier segment to block axially forward movement of the carrier segment and prevent separation of the hanger from the turbine case.

In some embodiments, the carrier segment further includes an anti-rotation platform extending axially away from a forward-facing surface of the outer wall, the locating plate further includes an anti-rotation recess formed in the main wall of the locating plate, and the anti-rotation recess is configured to receive the anti-rotation platform to block axially forward movement of the carrier segment and prevent separation of the hanger from the turbine case.

In some embodiments, the anti-rotation recess is defined by an axially forward wall, a first circumferential wall, and a second circumferential wall opposite the first circumferential wall, and a first circumferential end of the anti-rotation platform of the carrier segment and a second circumferential end of the anti-rotation platform opposite the first circumferential end are configured to engage with the first and second circumferential walls, respectively, so as to block circumferential movement of the carrier segment relative to the locating plate.

In some embodiments, the anti-rotation recess further includes a first peg extending radially upwardly from a bottom surface of the anti-rotation recess, the anti-rotation platform includes a first slot formed therein, and the first peg is arranged within the first slot so as to secure the anti-rotation platform within the anti-rotation recess.

According to a further aspect of the present disclosure, a method includes arranging a turbine case circumferentially around an axis, arranging a vane assembly circumferentially at least partway around the axis and radially inwardly of the turbine case, and the vane assembly including a first vane and an outer platform arranged on a radially outer end of the first vane, the outer platform including a first anti-rotation protrusion extending radially outwardly away from a radially outwardly-facing surface of the outer platform.

The method can further include arranging a locating plate circumferentially at least partway around the axis and coupling the locating plate with the turbine case radially outward of the vane assembly, the locating plate including a main wall, a first anti-rotation extension extending radially inwardly away from an aft end of the main wall, and a second anti-rotation extension extending radially inwardly away from the aft end of the main wall and circumferentially spaced apart from the first anti-rotation extension, and engaging the first anti-rotation protrusion of the vane assembly with one of the first anti-rotation extension and the second anti-rotation extension of the locating plate so as to block circumferential movement of the vane assembly relative to the locating plate.

These and other features of the present disclosure will become more apparent from the following description of the illustrative embodiments.

DETAILED DESCRIPTION OF THE DRAWINGS

Figure 1:
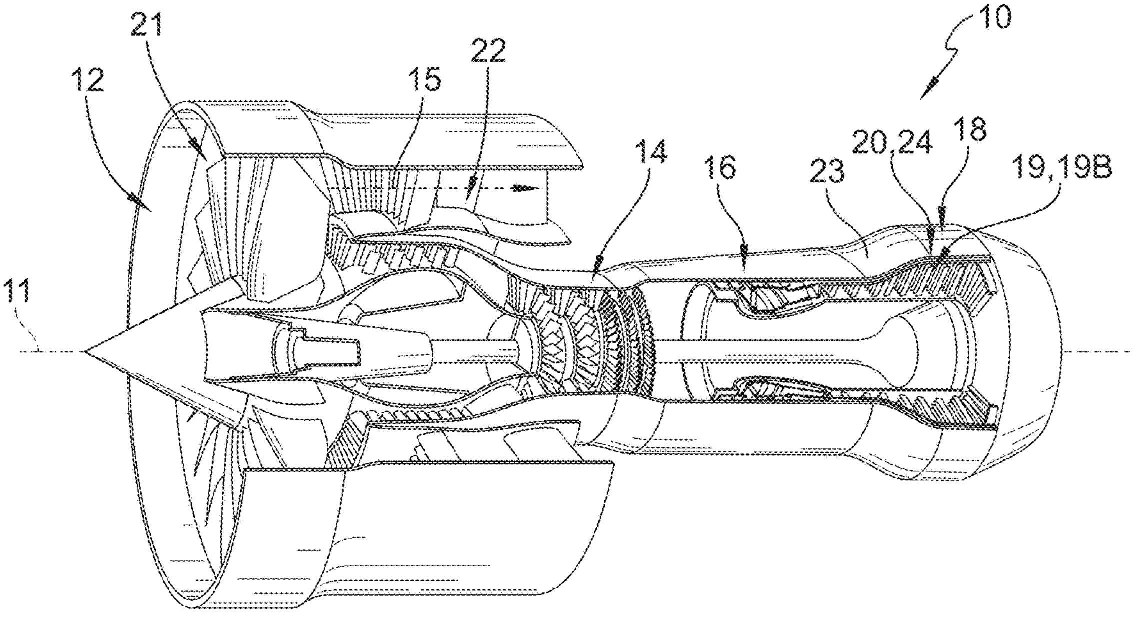
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine assembly and a turbine case.

For the purposes of promoting an understanding of the principles of the disclosure, reference will now be made to a number of illustrative embodiments illustrated in the drawings and specific language will be used to describe the same.

A turbine assembly 24 for use with a gas turbine engine 10 according to the present disclosure is shown in FIGS. 2-6C. An illustrative aerospace gas turbine engine 10 includes an inlet 12 and an engine core 13, the engine core 13 having a compressor 14, a combustor 16 located downstream of the compressor 14, and a turbine 18 located downstream of the combustor 16 as shown in FIG. 1. A fan 21 arranged in the inlet is driven by the turbine 18 and provides thrust for propelling the gas turbine engine 10 by forcing air 15 through a bypass duct 22. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 21.

The turbine 18 includes at least one turbine wheel assembly 19 and a turbine shroud 20 positioned to surround the turbine wheel assembly 19 as shown in FIG. 1. The turbine wheel assembly 19 includes a plurality of blades 19B. The hot, high pressure combustion products from the combustor 16 are directed toward the blades 19B of the turbine wheel assemblies 19. The turbine shroud 20 is coupled to a turbine case 23 of the gas turbine engine 10 and extends around the turbine wheel assembly 19 to block gases from passing over the turbine blades 19B during use of the turbine section 18 in the gas turbine engine 10.

The turbine assembly 24 is adapted for use in the gas turbine engine 10 of FIG. 1, in particular as a segment of the turbine shroud 20 of the turbine 18. Illustratively, the turbine assembly 24 includes the turbine case 23, a turbine shroud assembly 25 having a carrier segment 26 and a blade track segment 30, a locating plate 34 arranged axially forward of the carrier segment 26, and a vane assembly 88 arranged radially inwardly of the locating plate and axially forward of the turbine shroud assembly 25. The locating plate 34 is configured to be coupled to the turbine case 23 and includes an anti-rotation recess 52 that receives an anti-rotation platform 80 of the carrier segment 26 so as to block axially forward movement of the carrier segment 26, prevent separation of the carrier segment 26 from the turbine case 23, and block circumferential movement of the carrier segment 26 relative to the locating plate 34. Moreover, the locating plate 34 includes anti-rotation extensions 68, 74 that are configured to engage anti-rotation protrusions 92, 95 arranged on the vane assembly 88 to block circumferential movement of the vane assembly 88 relative to the locating plate 34.

Figure 2:
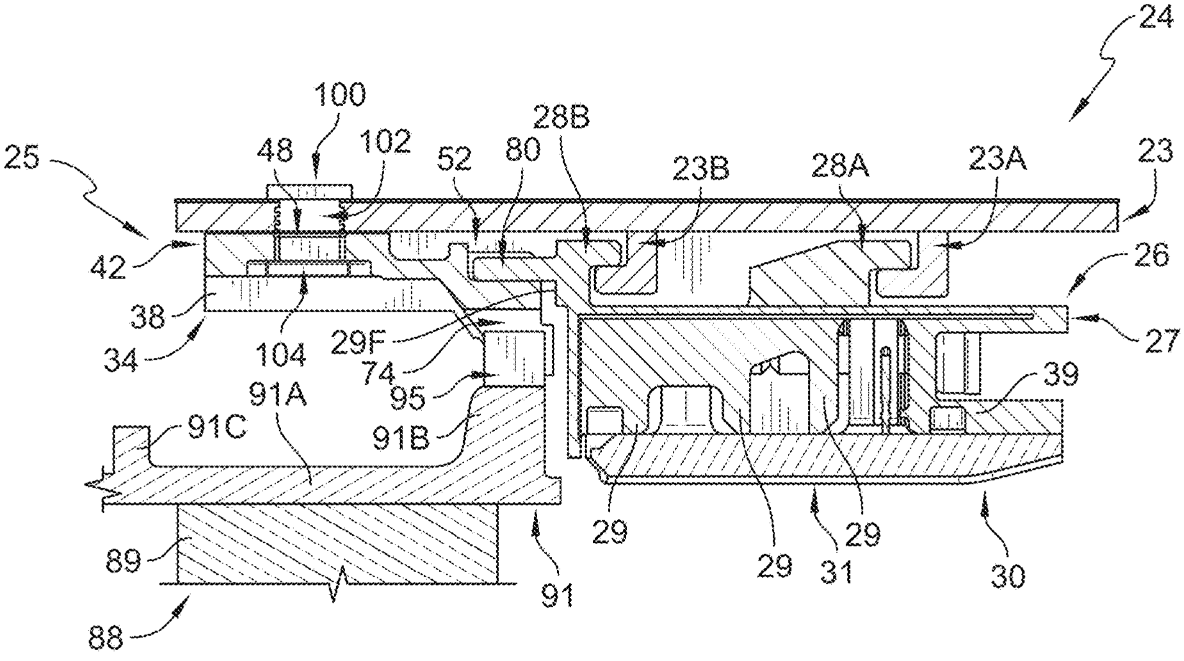
FIG. 2 is a side cross-sectional view of the turbine assembly of FIG. 1, showing a locating plate, a vane assembly, and a carrier segment of a turbine shroud assembly of the turbine assembly coupled to the turbine case, showing the locating plate located axially forward of the carrier segment so as to block axially forward movement of the carrier segment, and showing anti-rotation extensions of the locating plate arranged to engage anti-rotation protrusions on the vane assembly so as to block circumferential movement of the vane assembly relative to the locating plate.
Figure 5A:
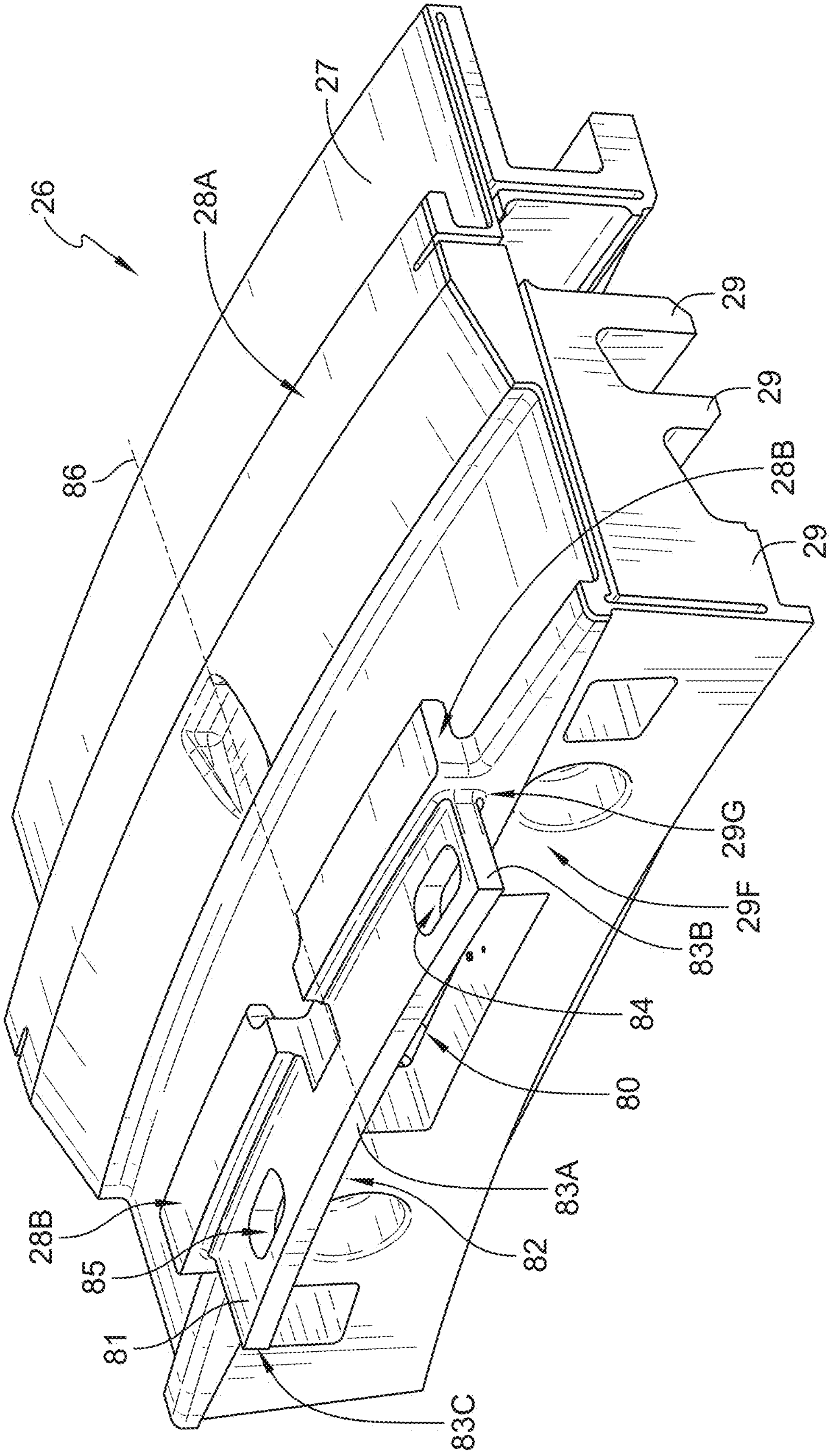
FIG. 5A is a perspective view of the carrier segment of the turbine shroud assembly of FIG. 2, showing the anti-rotation platform extending axially away from an outer wall of the carrier segment.
Figure 5B:
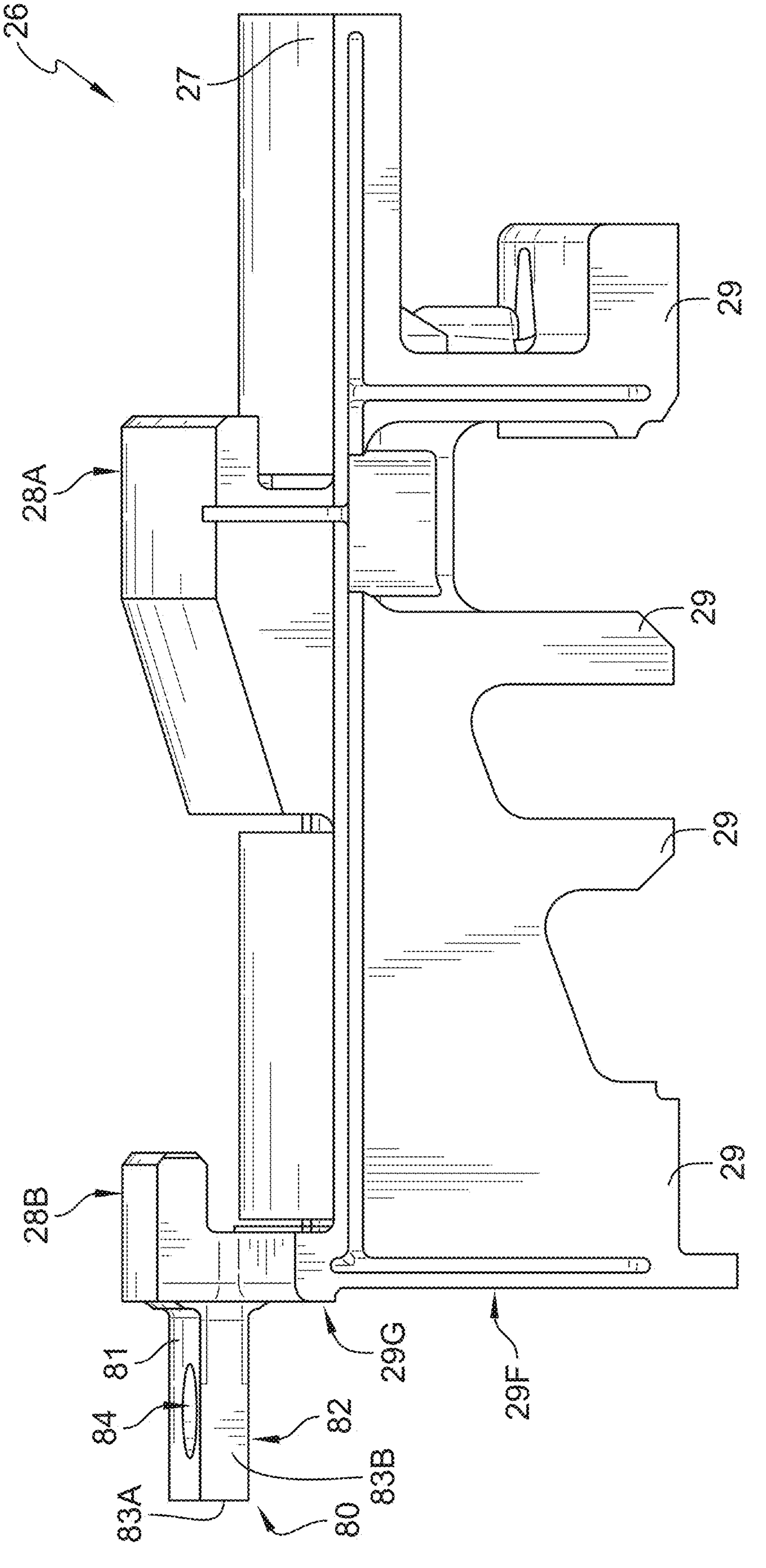
FIG. 5B is a side view of the carrier segment of FIG. 5A.
Figure 5C:
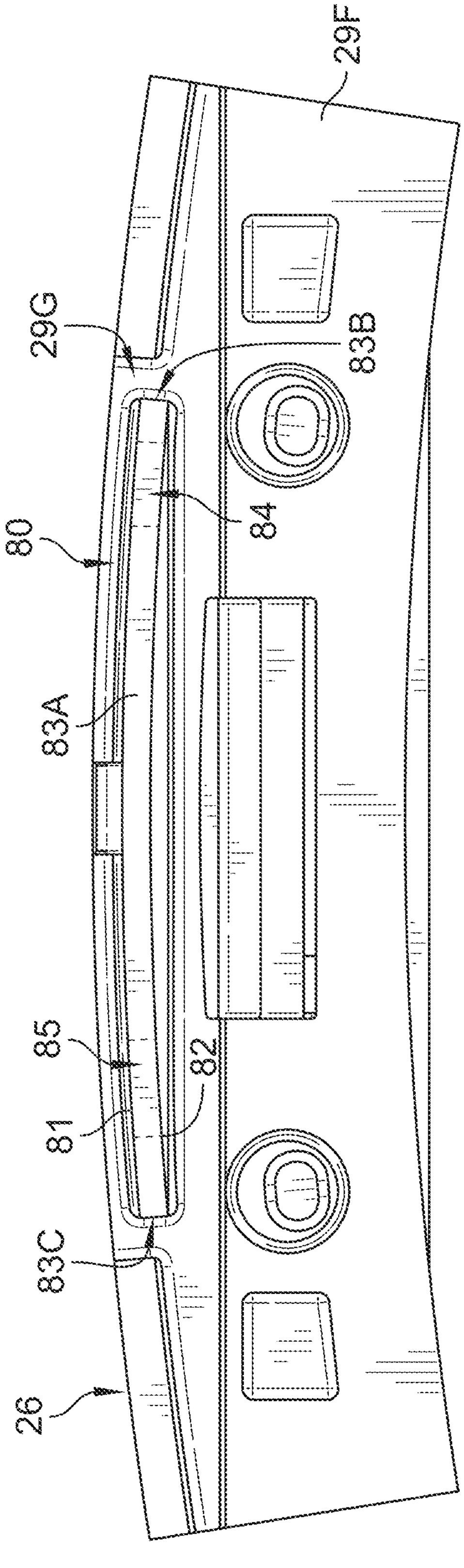
FIG. 5C is a front view of the carrier segment of FIG. 5A.

As shown in FIG. 2, and in greater detail in FIGS. 5A-5C, the turbine assembly 24 includes the turbine shroud assembly 25 including the carrier segment 26 and the blade track segment 30. Illustratively, the carrier segment 26 is a segmented portion of the turbine shroud 20 of the turbine 18, although a person skilled in the art will understand that a full hoop carrier may be utilized including the same components of the carrier segment 26 described herein.

The carrier segment 26 includes an outer wall 27 arranged circumferentially at least partway around the axis 11 of the gas turbine engine 10. The outer wall 27 may be curved about the axis 11 so as to define a first radius of curvature of the outer wall 27. The outer wall 27 may include two hangers 28A, 28B extending radially outwardly for coupling the carrier segment 26 to the turbine case 23. In some embodiments, the carrier segment 26 further includes a plurality of flanges 29 extending radially inwardly.

As can be seen in FIGS. 2 and 5A-5C, a first hanger 28A of the carrier segment 26 may be coupled to a first hook 23A of the turbine case 23, and a second hanger 28B may be coupled to a second hook 23B of the turbine case 23. The first hanger 28A is located axially aft of and spaced apart from the second hanger 28B. Similarly, the first hook 23A is located axially aft of and spaced apart from the second hook 23B. Each hanger 28A, 28B and each hook 23A, 23B may extend in the circumferential direction as well, and may extend equal lengths in this direction.

Illustratively, the carrier segment 26 further includes a blade track segment 30 arranged circumferentially at least partway around the axis 11 of the gas turbine engine 10, although a person skilled in the art will understand that a full hoop blade track may be utilized including the same components of the blade track segment 30 described herein. As can be seen in FIGS. 2 and 5A-5C, the blade track segment 30 may be a ceramic matrix composite component configured to directly face the high temperatures of the gases flowing through the gas turbine engine 10. The carrier segment 26 may be a metallic support component configured to interface with other metallic components of the gas turbine engine 10 to support the blade track segment 30 to radially locate the bladed track segment 30 relative to the axis 11.

During operation of the gas turbine engine 10, the hot, high-pressure products directed into the turbine 18 from the combustor 16 flow across a shroud wall 31 of the blade track segment 30. The hot gases flowing across the shroud wall 31 heat the blade track segment 30, which may transfer heat to retainers (not shown) that couple the blade track segment 30 to the carrier segment 26. The shroud wall 31 may define a portion of a gas path of the turbine assembly 24.

In the illustrative embodiment, the turbine shroud 20 is made up of a number of turbine assemblies 24, including the carrier segment 26 and the locating plate 34 described in detail below, that each extend circumferentially partway around the axis 11 and cooperate to surround the turbine wheel assembly 19. In other embodiments, the turbine shroud 20 is annular and not segmented to extend fully around the axis 11 and surround the turbine wheel assembly 19. In yet other embodiments, certain components of the turbine shroud 20 are segmented while other components are annular and not segmented.

As can be seen in FIGS. 2 and 5A-5C, the carrier segment 26 further includes an anti-rotation platform 80 extending axially from a forward-facing surface 29F of the outer wall 27. In some embodiments, and as illustratively shown in FIGS. 5A-5C, the anti-rotation platform 80 extends axially from a radially outer side 29G of the forward-facing surface 29F, which, in some embodiments, may be referred to as a forward-facing surface 29G of the second hanger 28B. In some embodiments, the center of the anti-rotation platform 80 is aligned with a central axis 86 of the carrier segment 26, and thus the central axis 86 as shown in FIG. 5A also defines the central axis of the anti-rotation platform 80.

As shown in detail in FIGS. 5A-5C, the anti-rotation platform 80 includes an upper surface 81, a bottom surface 82 opposite the upper surface 81, an axially forward end 83A, a first circumferential end 83B, and a second circumferential end 83C opposite the first circumferential end 83B.

The anti-rotation platform 80 further includes a first slot 84 and a second slot 85 circumferentially spaced apart from the first slot 84, as shown in FIGS. 5A-5C. Each slot 84, 85 includes a stadium shape, in particular having a rectangular shape with semi-circular ends. In some embodiments, the slots 84, 85 are offset from the central axis 86 of the anti-rotation platform 80. For example, as can be seen in FIGS. 5A-5C, the first slot 84 is further from the central axis 86 than the second slot 85. Moreover, the first slot 84 is closer to the first circumferential end 83B than the second slot 85 is to the second circumferential end 83C.

The turbine assembly 24 further includes the locating plate 34, as shown in FIGS. 2-4C and 6A-6C. Illustratively, the locating plate 34 is a segmented portion of the turbine shroud 20 of the turbine 18 and is arranged circumferentially at least partway around the axis 11. A person skilled in the art will understand that a full hoop locating plate may be utilized including the same components of the locating plate 34 described herein.

Figure 3A:
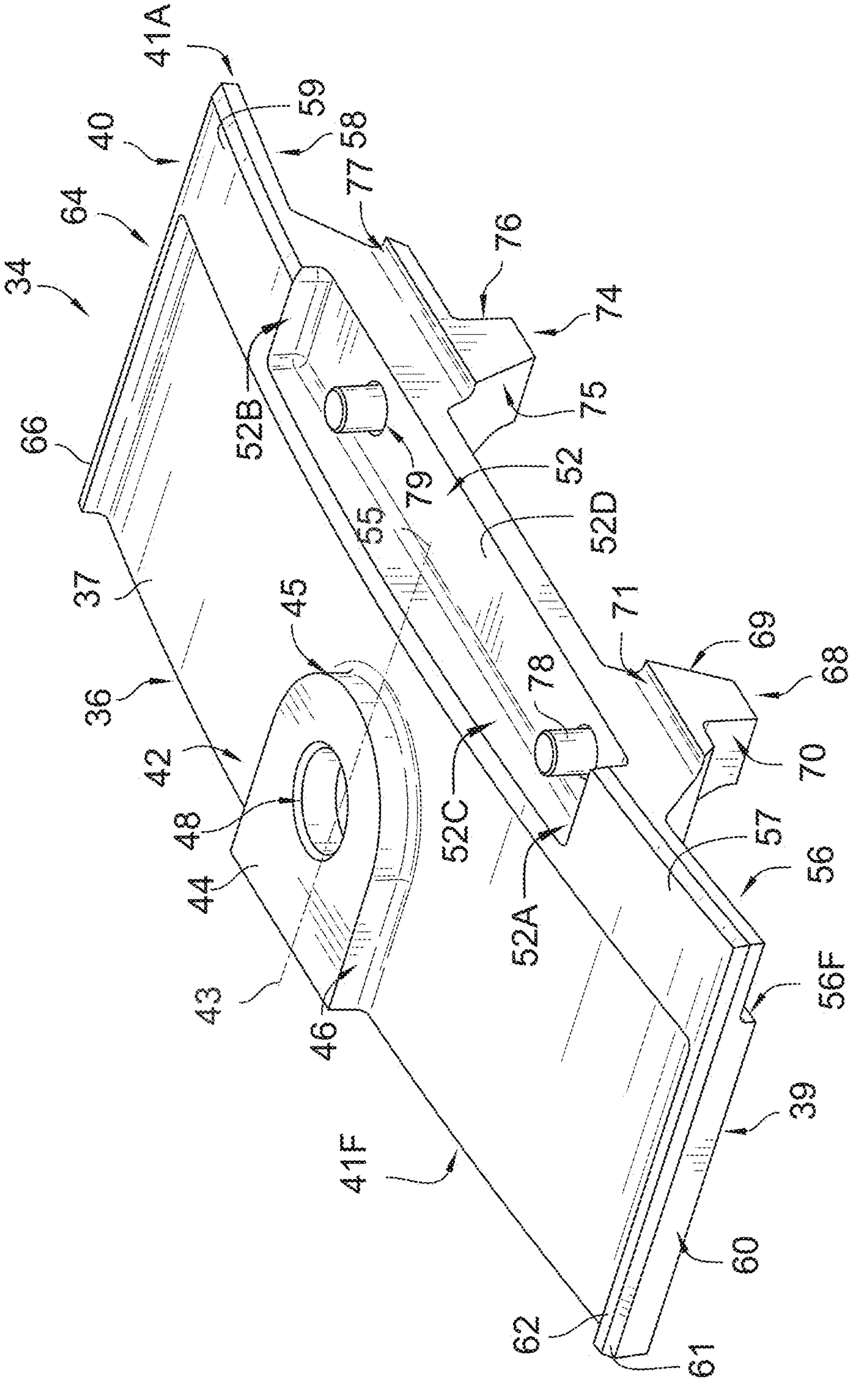
FIG. 3A is a perspective view of the locating plate of the turbine assembly of FIG. 2, showing that the locating plate includes a main wall having a main wall upper surface, a raised portion extending upwardly away from the main wall upper surface, and two anti-rotation extensions extending downwardly away from an aft end of the main wall, and showing an anti-rotation recess configured to receive an anti-rotation platform of the carrier segment.
Figure 3B:
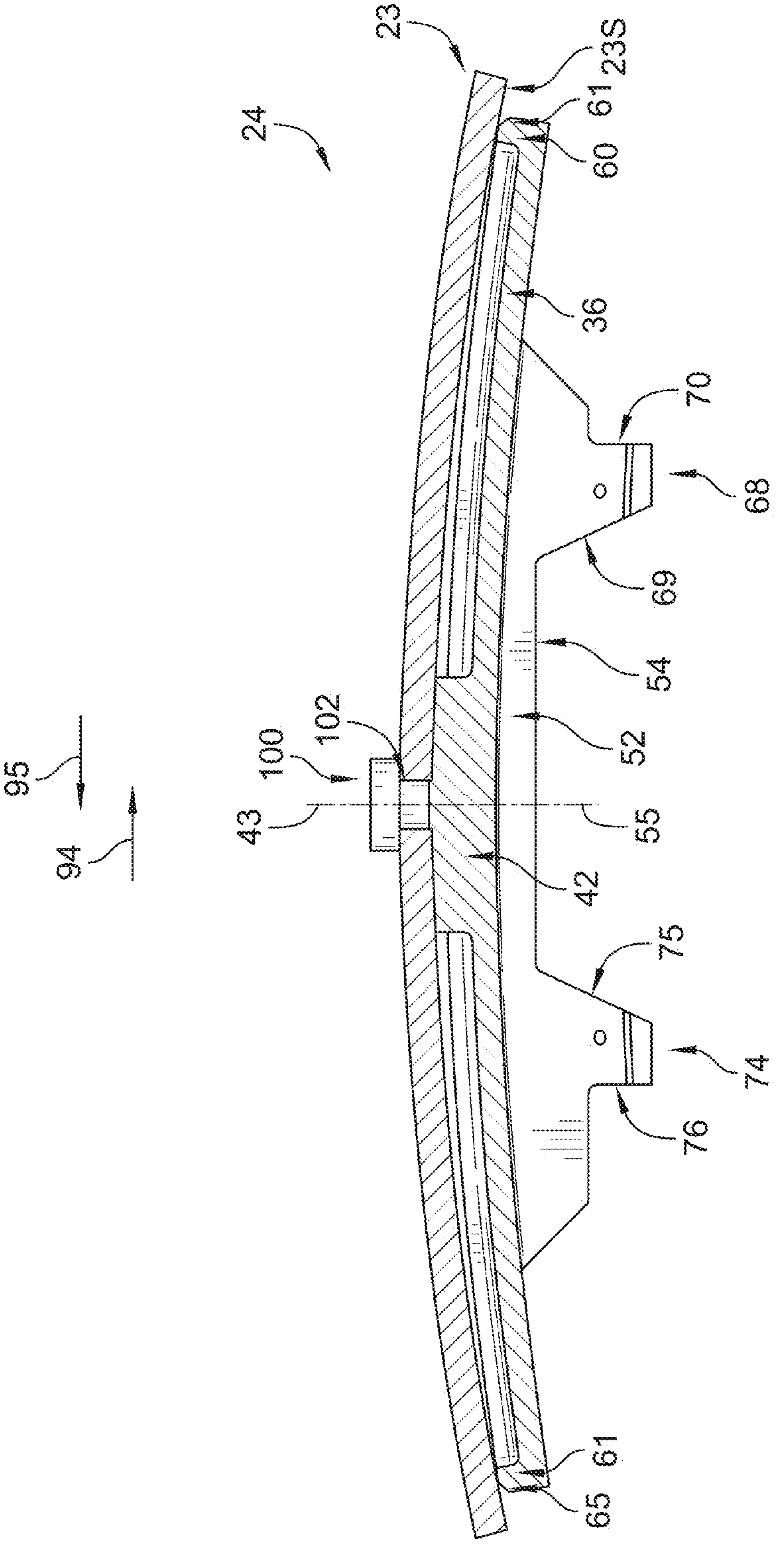
FIG. 3B is a front view of the locating plate of the turbine assembly of FIG. 2, showing the locating plate coupled to the turbine case.

The locating plate 34 is arranged axially forward of the carrier segment 26 and includes a main wall 36 that may be curved about the axis 11 so as to define a first radius of curvature of the main wall 36, as shown in FIGS. 2-3B. In some embodiments, a second radius of curvature of the outer wall 27 of the carrier segment 26, as described below, is equal to the first radius of curvature of the main wall 36. In some embodiments, the first and second radii of curvature of the outer wall 27 and the main wall 36 are equal to a third radius of curvature of the turbine case 23.

Illustratively, the main wall 36 extends further in the circumferential direction than the axial direction, and has a relatively small thickness as measured in the radial direction. As can be seen in FIGS. 2-3B, the mail wall 36 includes a main wall upper surface 37 and a mail wall bottom surface 38 opposite the main wall upper surface 37. The main wall 36 further includes a first circumferential side 39 and a second circumferential side 40 opposite the first circumferential side 39.

As shown in detail in FIGS. 3A and 3B, the locating plate 34 further includes a raised portion 42 extending upwardly away from the main wall upper surface 37. A person skilled in the art will understand that the usage of the terms "upwardly" or "downwardly" herein correspond to radially outwardly and radially inwardly, respectively, unless otherwise noted. The raised portion 42 may be generally rectangular with a curved axially aft side 45. The raised portion 42 may located centrally along a circumferential extent of the main wall 36. In some embodiments, the main wall 36 may be divided in half by a central, axially extending axis 43, and the raised portion 42 may be arranged exactly centrally on the axis 43.

The raised portion 42 may define a raised portion upper surface 44 that is curved so as to define a fourth radius of curvature, as can be seen in detail in FIGS. 3A and 3B. In some embodiments, the fourth radius of curvature of the raised portion upper surface 44 is equal to the first, second, and third radii of curvatures of the outer wall 27, the main wall 36, and the turbine case 23. The raised portion 42 may include a filleted outer surface 46 that extend to the main wall upper surface 37. The raised portion upper surface 44 may be configured to lie flush against a radially inwardly facing surface 23S of the turbine case 23 when coupled to the turbine case 23, as shown in FIG. 3B.

The raised portion 42 further includes a hole 48 extending radially therethrough, as shown in FIGS. 2-3B. In some embodiments, the hole 48 may extend entirely through the raised portion 42 and entirely through the main wall 36 continuously. Illustratively, as shown specifically in FIG. 3E, the main wall 36 includes a circular recess 50 formed therein that opens to the main wall bottom surface 38. The hole 48 may open into the circular recess 50, and in some embodiments, the diameter of the hole 48 is smaller than the diameter of the circular recess 50. As shown in FIGS. 2 and 3B, a fastener 100 may extend through a hole 102 in the turbine case 23 and may be secured via a nut 104 so as to couple the locating plate 34 to the turbine case 23.

The locating plate 34 may further include a first axially aft ledge 56 extending axially away from the main wall 36, as shown in detail in FIG. 3A. The first axially aft ledge 56 may extend circumferentially toward and connect with a second axially aft ledge 58 located on the opposing circumferential side of the main wall 36, as also shown in FIG. 3A.

Figure 3E:
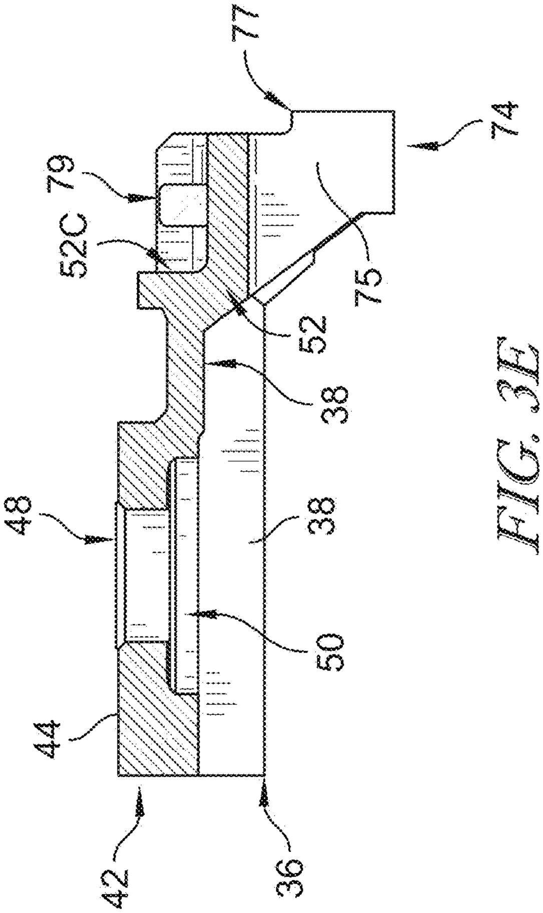
FIG. 3E is a side cross-sectional view of the side view of FIG. 3C showing the locating plate of the turbine assembly of FIG. 3A, showing the recess formed in the lower surface of the main wall, the hole for the fastener, and the first anti-rotation extension, and showing the anti-rotation recess of the locating plate.
Figure 3C:
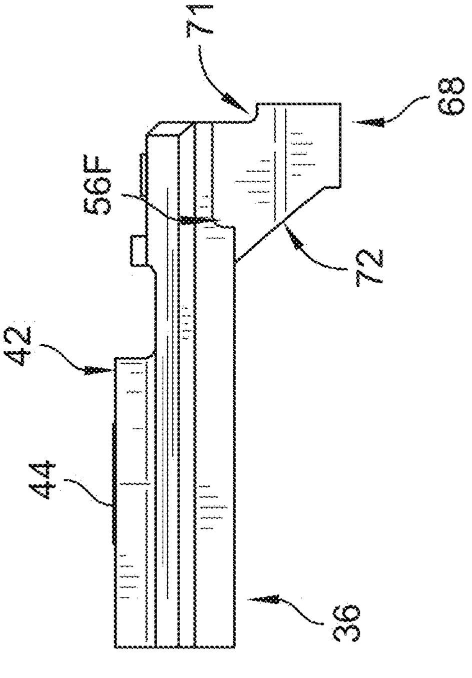
FIG. 3C is a side view of the locating plate of the turbine assembly of FIG. 3A.
Figure 3D:
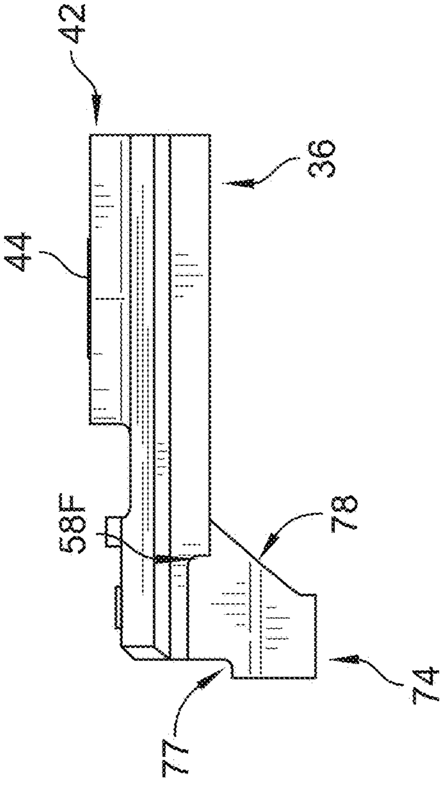
FIG. 3D is a side view opposite the side view of FIG. 3C showing the locating plate of the turbine assembly of FIG. 3A.

Each of the first and second axially aft ledges 56, 58 is raised above the main wall upper surface 37, as can be seen in FIG. 3A. Illustratively, the main wall 36 transitions into the first and second axially aft ledges 56, 58 via the fillets 56F, 58F, as shown in FIGS. 3A, 3C, and 3D. The first and second axially aft ledges 56, 58 can include generally flat upper surfaces 57, 59 that connect to each other and have the same radii of curvatures as the main wall 36.

The locating plate 34 may further include first and second circumferential ledges 60, 64 arranged on the first and second circumferential sides 39, 40 of the main wall 36, as shown in FIGS. 3A and 3B. Each of the first and second circumferential ledges 60, 64 extend upwardly away from the main wall upper surface 37 and also extend axially from the axially forward side 41F of the main wall 36 along the first and second circumferential sides 39, 40 to the first and second axially aft ledges 56, 58, respectively. In some embodiments, the first and second circumferential ledges 60, 64 include sloped edges 61, 65 and flat top surface 62, 66 configured to contact the radially inwardly facing surface 23S of the engine case 23 simultaneously with the upper surface 44 of the raised portion 42.

Illustratively, the locating plate 34 further includes an anti-rotation recess 52 formed in the aft end 41A of the main wall 36, as shown in FIGS. 3A, 4C, and 6A-6C. The anti-rotation recess 52 is formed within the first and second axially aft ledges 56, 58 and is defined by a first circumferential wall 52A, a second circumferential wall 52B opposite the first circumferential wall 52A, an axially forward wall 52C, and a bottom surface 52D. The anti-rotation recess 52 may be a rectangular shape such that the axially forward wall 52C is longer than the first and second circumferential walls 52A, 52B.

As can be seen in FIGS. 3A, 4C, and 6A-6C, first and second pegs 78, 79 extend upwardly away from the bottom surface 52D of the anti-rotation recess 52. The pegs 78, 79 may extend upwardly away from the bottom surface 52D a smaller distance than the axially forward wall 52C such that the top of the pegs 78, 79 is located below the top of the axially forward wall 52C, as shown in FIG. 3E. As will be described in greater detail below with reference to FIGS. 6A-6C, the pegs 78, 79 are configured to be arranged within the slots 84, 85 of the anti-rotation platform 80 of the carrier segment 26 so as to locate the carrier segment 26 relative to the locating plate 34.

In some embodiments, the pegs 78, 79 are offset from a central axis 55 of the anti-rotation recess 52, which is aligned with the central axis 43 of the locating plate 33. For example, as can be seen in FIG. 3A, the first peg 78 is further from the central axis 55 than the second peg 79, and is closer to the first circumferential wall 52A than the second peg 79 is to the second circumferential wall 52B.

The locating plate 34 further includes first and second anti-rotation extensions 68, 74 extending radially inwardly away from the lower surface 54, as shown in FIGS. 3A-4C. The first anti-rotation extension 68 is circumferentially spaced apart from the second anti-rotation extension 74. Illustratively, the first anti-rotation extension 68 includes a sloped inner surface 69 and an opposing, first extension surface 70 that faces a first circumferential direction 94, as shown in FIG. 3B. The sloped inner surface 69 faces an opposing, second circumferential direction 95. Similarly, the second anti-rotation extension 74 includes a sloped inner surface 75 and an opposing, second extension surface 76 that faces the second circumferential direction 95. The sloped inner surface 75 faces the first circumferential direction 94. The angles of the slopes of the sloped inner surfaces 69, 75 may be the same or different. In some embodiments, the first and second anti-rotation extensions 68, 74 may each include a stepped axially aft surface 71, 77 and a sloped axially forward surface 72, 78, as shown in FIGS. 3C and 3D.

In some embodiments, as shown in FIG. 3B, the first anti-rotation extension 68 is circumferentially spaced apart from the central axis 43 a first distance and the second anti-rotation extension 74 is circumferentially spaced apart from the central axis 43 a second distance. Illustratively, the first distance between the extension 68 and the central axis 43 is different than the second distance between the extension 74 and the central axis 43, although a person skilled in the art will understand that the first and second distances may be equal based on the design of the turbine assembly 24 components.

In some embodiments, the first anti-rotation extension 68 is circumferentially spaced apart from the central axis 55 of the anti-rotation recess 52 a first distance and the second anti-rotation extension 74 is circumferentially spaced apart from the central axis 55 a second distance. Illustratively, the first distance between the extension 68 and the central axis 55 is different than the second distance between the extension 74 and the central axis 55, although a person skilled in the art will understand that the first and second distances may be equal based on the design of the turbine assembly 24 components.

Figure 4A:
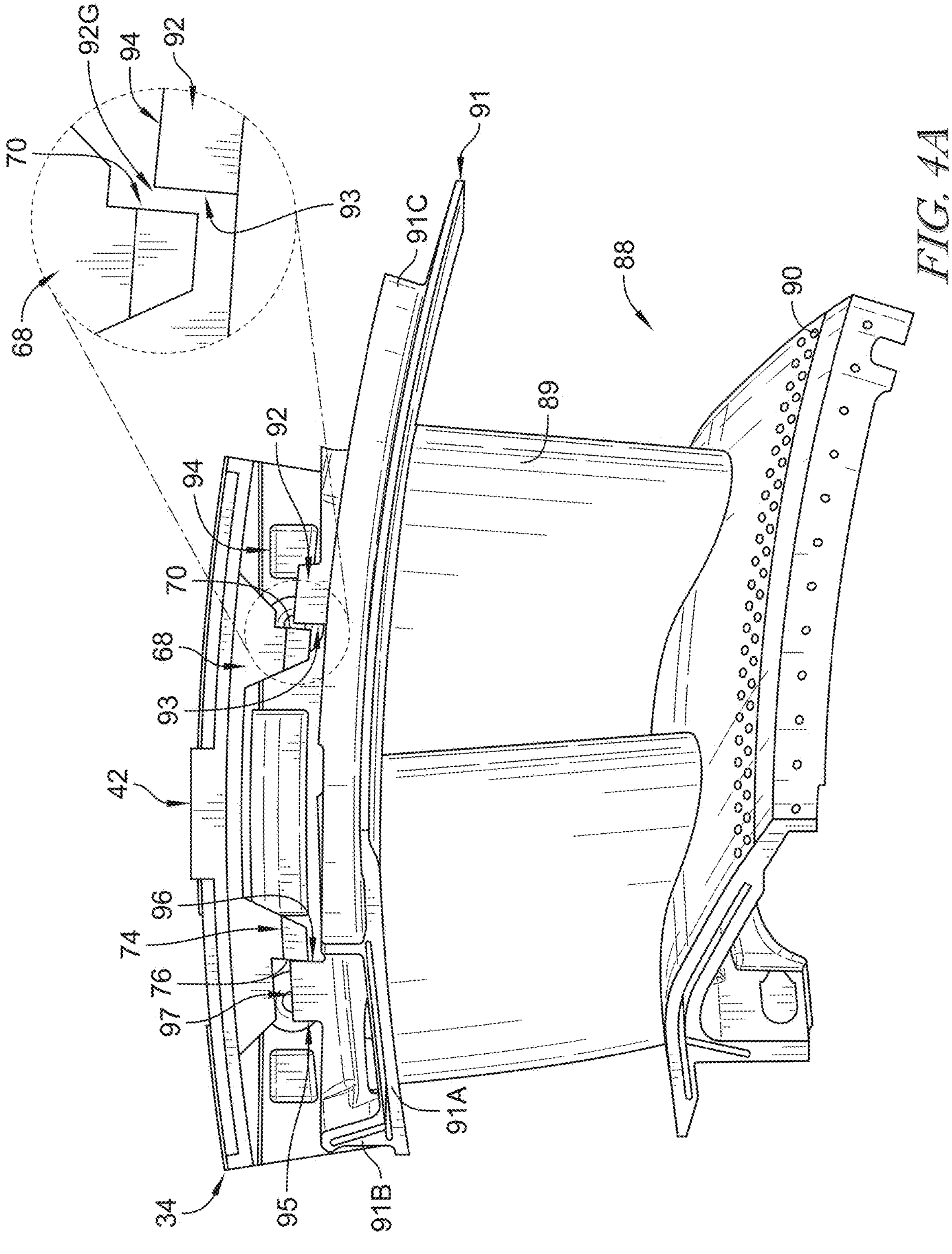
FIG. 4A is a front view of the turbine assembly of FIG. 2, showing the vane assembly, the locating plate, and the carrier segment.
Figure 4B:
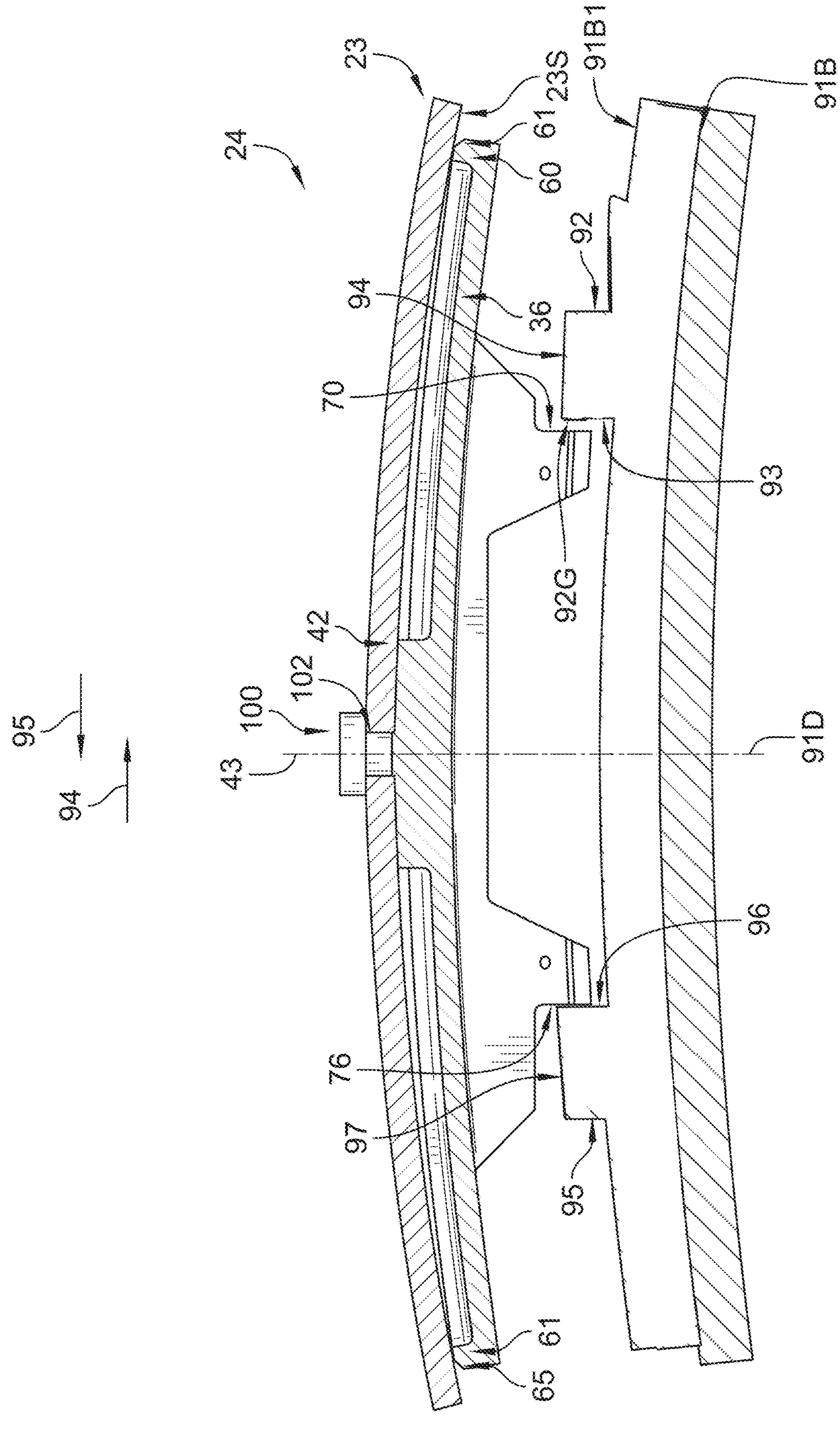
FIG. 4B is a front cross-sectional view of the vane assembly and locating plate of FIG. 4A taken through line 4B of FIG. 4C, showing the two anti-rotation protrusions and the two anti-rotation extensions being circumferentially spaced apart.
Figure 4C:
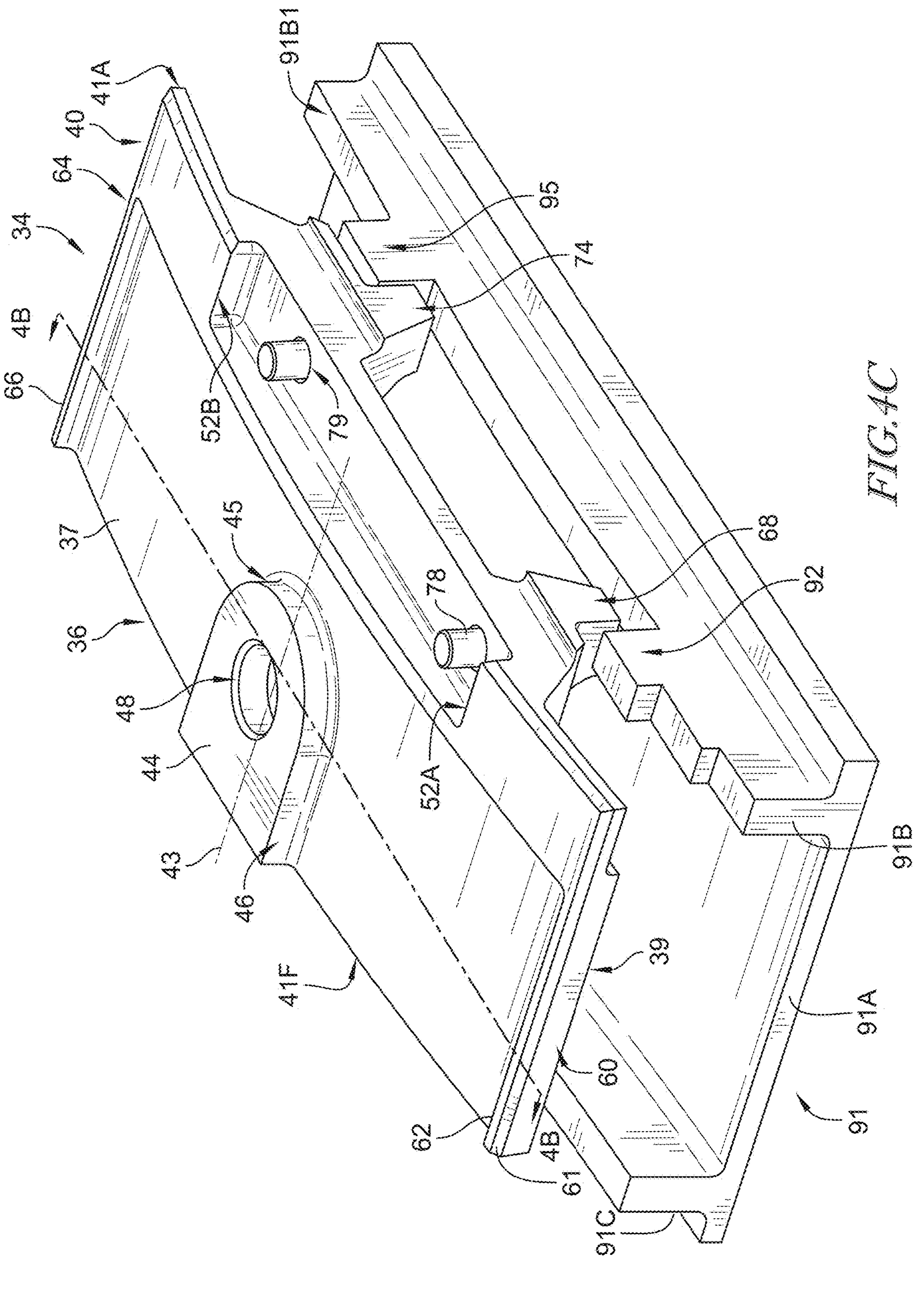
FIG. 4C is a perspective view of the vane assembly and the locating plate of FIG. 4B.

As shown in FIG. 2, and in greater detail in FIGS. 4A-4C, the turbine assembly 24 further includes the vane assembly 88. Illustratively, the vane assembly 88 extends partway around the axis 11 and is segmented. In the illustrative embodiment, a plurality of vane assemblies 88 each extend circumferentially partway around the axis 11 and cooperate to form a fully annular vane assembly. In other embodiments, the vane assembly 88 may be fully annular and not segmented to extend fully around the axis 11.

The vane assembly 88 includes a plurality of vanes 89 circumferentially spaced apart from each other, as shown in FIG. 4A. The vane assembly 88 further includes an inner platform 90 arranged on a radially inner side of the vanes 89, and an outer platform 91 arranged on a radially outer end of the vanes 89. As can be seen in FIGS. 4B and 4C, the outer platform 91 includes a main platform 91A, an axially aft flange 91B that extends circumferentially along the main platform 91A, and an axially forward flange 91C that extends circumferentially along the main platform 91A and is axially spaced apart from the axially aft flange 91B. In some embodiments, a central axis 91D of the main platform 91A is aligned with the central axis 43 of the locating plate 34. In some embodiments, the main platform 91A of the outer platform 91 is curved so as to define a fifth radius of curvature. In some embodiments, the first, second, third, and fourth radii of curvature are equal to the fifth radius of curvature of the main platform 91A of the outer platform 91.

As can be seen in detail in FIGS. 4A-4C, the outer platform 91 includes first and second anti-rotation protrusions 92, 95 that extend radially outwardly away from a radially outwardly-facing surface 91B1 of the outer platform 91. Specifically, the anti-rotation protrusions 92, 95 extend radially outwardly away from a top surface 91B1 of the axially aft flange 91B of the outer platform 91, as can be seen in FIGS. 4B and 4C.

Illustratively, the first and second anti-rotation protrusions 92, 95 are formed as block-like structures that extend upwardly from the axially aft flange 91B and are circumferentially spaced apart from each other, as shown in FIGS. 4A-4C. The first anti-rotation protrusion 92 includes a first protrusion surface 93 that faces the second circumferential direction 95 and the second anti-rotation protrusion 95 includes a second protrusion surface 96 that faces the first circumferential direction 94. Each anti-rotation protrusion 92, 95 also includes a radially outer surface 94, 97 that is radially spaced apart from the anti-rotation extensions 68, 74 of the locating plate 34, as shown in FIG. 4B.

Illustratively, the first and second anti-rotation protrusions 92, 95 are circumferentially spaced apart such that they are configured to engage and contact the anti-rotation extensions 68, 74 of the locating plate 34, as shown in FIGS. 4A-4C. Specifically, the first and second protrusion surfaces 93, 96 are configured to engage the first and second extension surfaces 70, 76 of the anti-rotation extensions 68, 74 so as to block circumferential movement of the vane assembly 88 relative to the locating plate 34 in response to circumferential forces acting on the vane assembly 88, as shown in FIG. 4B. Specifically, the first extension wall 70 will block circumferential movement of the vane assembly 88 in the second circumferential direction 95, and the second extension wall 76 will block circumferential movement of the vane assembly 88 in the first circumferential direction 94. In this way, circumferential loads can be transferred from the vane assembly 88 to the locating plate 34, and thus to the turbine case 23.

In some embodiments, the first and second anti-rotation protrusions 92, 95 are circumferentially spaced far enough apart such that at least one of the first and second protrusion surfaces 93, 96 is slightly spaced apart from the corresponding extension surface 70, 76 (shown exaggerated in FIG. 4A). For example, a gap 92G exists between the first protrusion surface 93 and the first extension surface 70, while no gap exists between the second protrusion surface 96 and the second extension surface 76, as shown in FIGS. 4A and 4B. In some embodiments, a gap exists between both sets of surfaces 70, 76, 93, 96. The small gap or gaps allow for thermal expansion of the components of the turbine assembly 24 or any other incidental movement of the components. The gap or gaps are small enough to allow an extremely small amount of movement in the event the vane assembly 88 moves circumferentially before being stopped by one of the extension surfaces 70, 76. In some embodiments, no gap exists between either set of surfaces 70, 76, 93, 96 such that no movement or expansion of components is permitted.

Figure 6A:
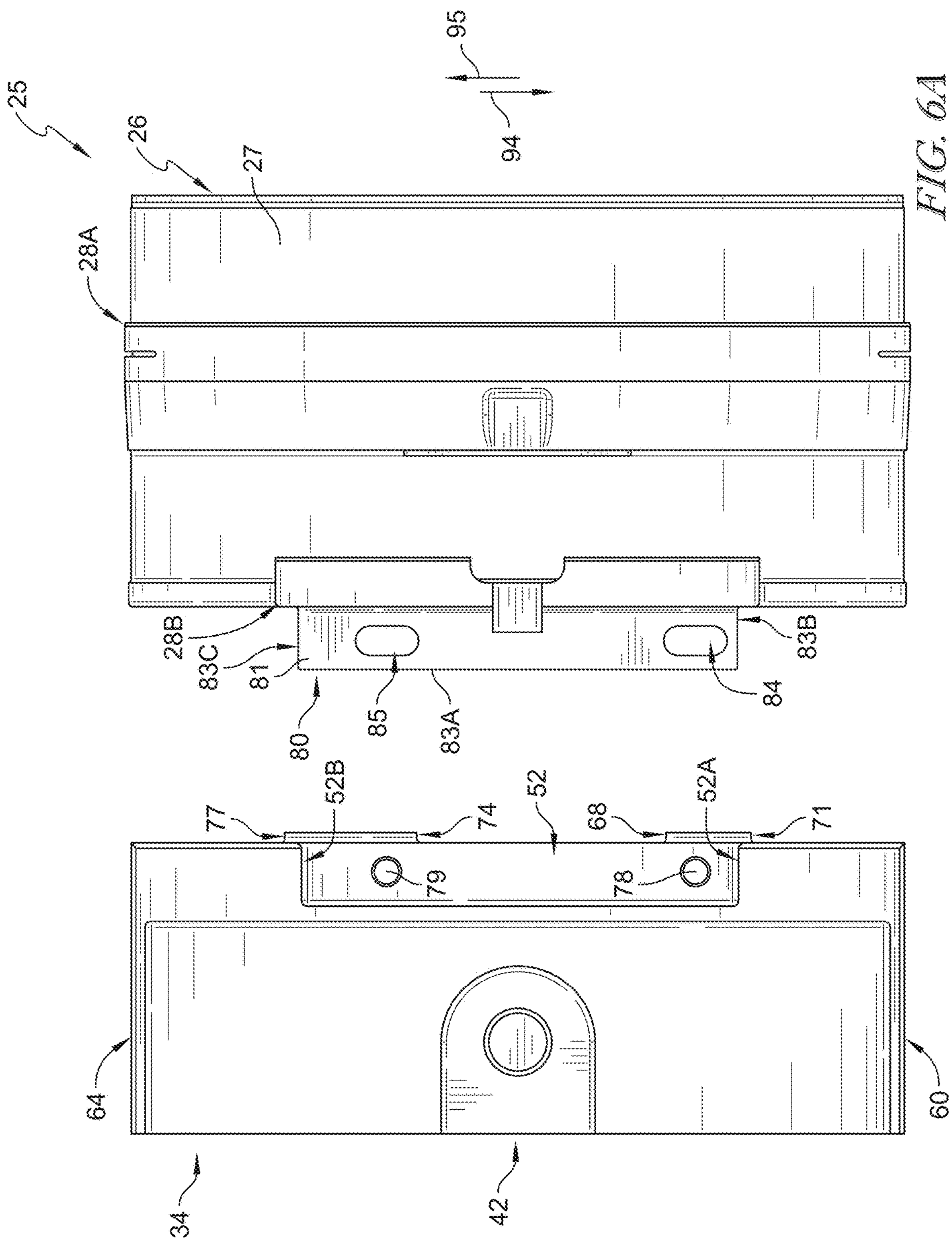
FIG. 6A is a top view of the locating plate and the carrier segment of the turbine assembly of FIG. 2 prior to being assembled, showing the anti-rotation platform of the carrier segment aligned to be received within the anti-rotation recess of the locating plate.
Figure 6B:
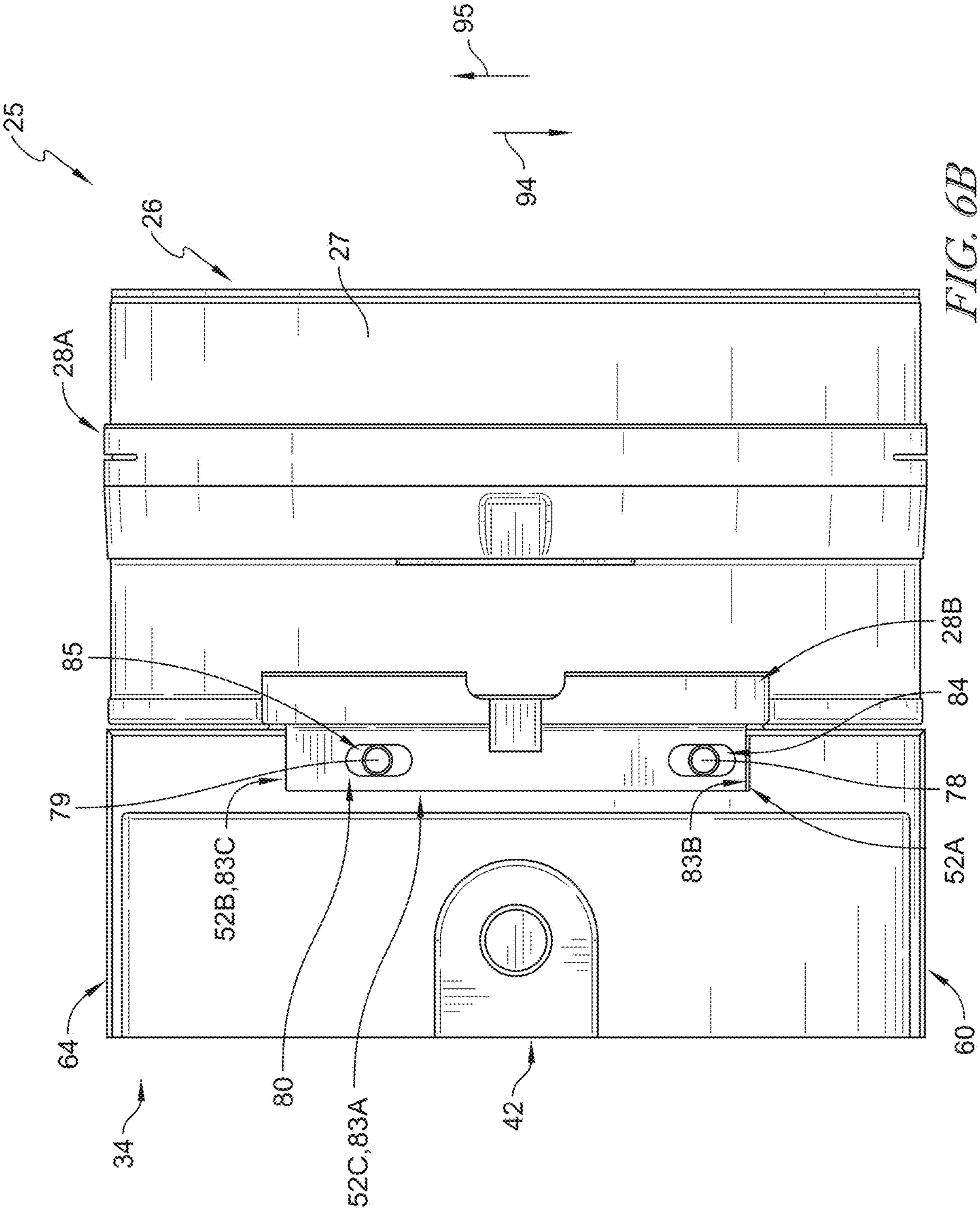
FIG. 6B is a top view of the locating plate and the carrier segment of the turbine assembly of FIG. 2 when assembled, showing the anti-rotation platform of the carrier segment received within the anti-rotation recess of the locating plate, and showing two pegs of the recess arranged within two slots formed in the anti-rotation platform.
Figure 6C:
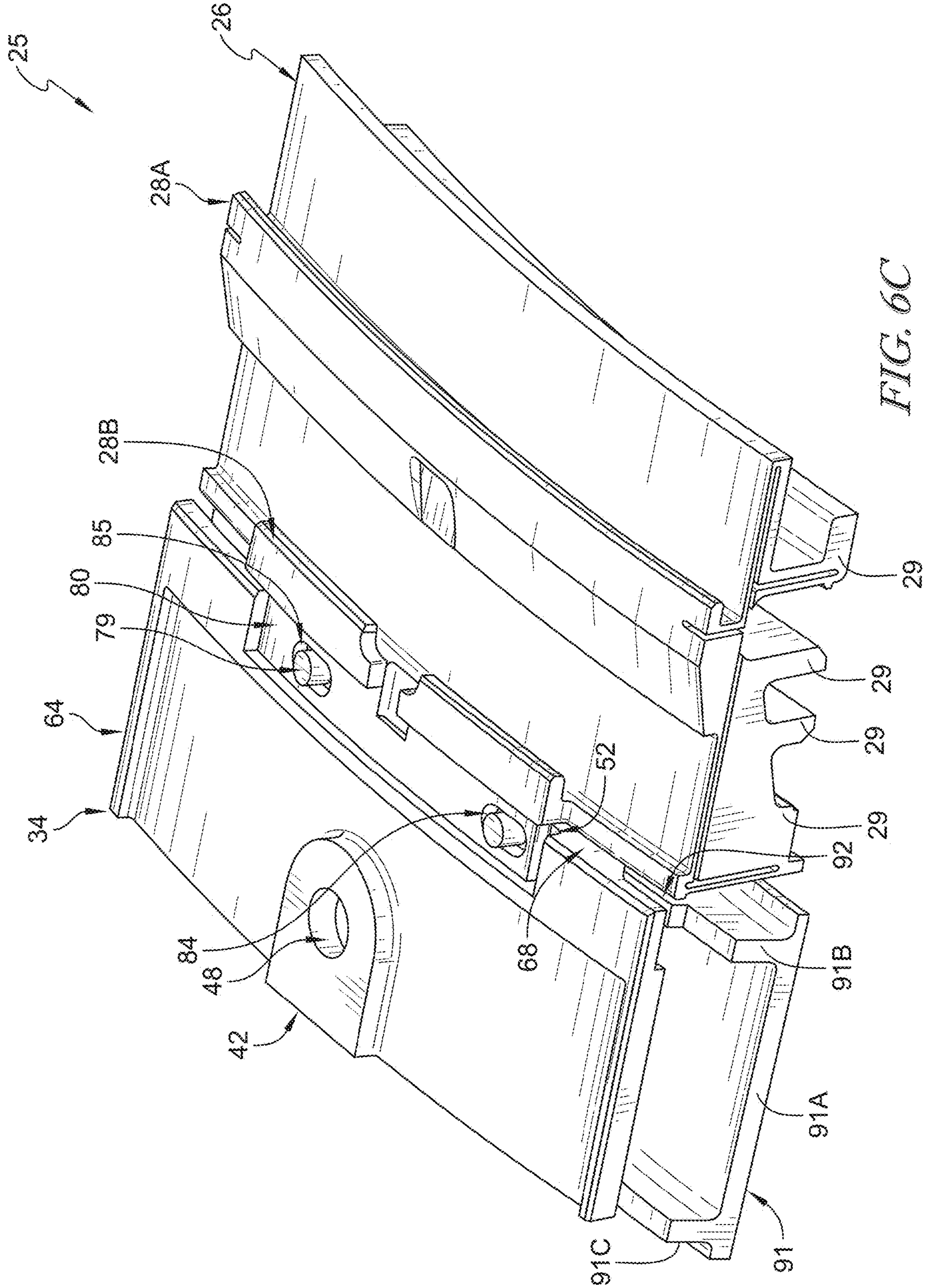
FIG. 6C is a perspective view of the assembled locating plate and carrier segment of the turbine assembly of FIG. 6B.

As can be seen in FIGS. 6A-6C, the anti-rotation platform 80 of the carrier segment 26 is aligned with the anti-rotation recess 52 of the locating plate 34. Specifically, FIG. 6A shows the alignment of the anti-rotation platform 80 and the anti-rotation recess 52 prior to assembly of the locating plate 34 with the carrier segment 26, and FIGS. 6B and 6C show the locating plate 34 with the carrier segment 26 in an assembled arrangement (also shown in FIGS. 2 and 4B).

As can be seen in FIG. 6B, as well as FIG. 2, the axially aft end 41A of the locating plate 34 is slightly axially spaced apart from the forward-facing surface 29F of the carrier segment 26 so as to allow for thermal expansion of the components of the turbine assembly 24. Once assembled, the anti-rotation platform 80 rests securely in the anti-rotation recess 52 and the pegs 78, 79 are arranged within the slots 84, 85. The pegs 78, 79 are configured to be arranged within the slots 84, 85 of the anti-rotation platform 80 of the carrier segment 26 so as to locate the carrier segment 26 relative to the locating plate 34.

Moreover, as can be seen in FIG. 6B, the walls of the anti-rotation platform 80 and the anti-rotation recess 52 engage each other so as to transfer loads from the carrier segment 26 to the locating plate 34, and thus to the turbine case 23. For example, the axially forward end 83A of the anti-rotation platform 80 rests against the axially forward wall 52C of the anti-rotation recess 52 so as to block axially forward movement of the carrier segment 26 and transfer axial loads from the carrier segment 26 to the locating plate 34. Moreover, the axially forward end 83A rests against the axially forward wall 52C so as to prevent separation of the hangers 28A, 28B from the hooks 23A, 23B of the turbine case 23. In some embodiments, a small gap exists between the axially forward end 83A of the anti-rotation platform 80 rests against the axially forward wall 52C of the anti-rotation recess 52 to allow for thermal expansion of the components of the turbine assembly 24 or any other incidental movement of the components.

Similarly, one or both of the first and second circumferential ends 83B, 83C of the anti-rotation platform 80 rest against the first and second circumferential walls 52A, 52B of the anti-rotation recess 52 so as to prevent circumferential movement of the carrier segment 26 relative to the locating plate 34 and so as to transfer circumferential loads from the carrier segment 26 to the locating plate 34. Specifically, the first circumferential wall 52A will block circumferential movement of the carrier segment 26 in the first circumferential direction 94, and the second circumferential wall 52B will block circumferential movement of the carrier segment 26 in the second circumferential direction 95.

In some embodiments, one or both of the first and second circumferential walls 52A, 52B is slightly spaced apart from the corresponding first and second circumferential ends 83B, 83C of the anti-rotation platform 80 (shown in FIG. 6B with regard to the first circumferential end and wall 83B, 52A). Similar to the very slight spacing of the sets of surfaces 70, 76, 93, 96 of the anti-rotation extensions and protrusions 68, 74, 92, 95 described above, small gap or gaps allow for thermal expansion of the components of the turbine assembly 24 or any other incidental movement of the components. The gap or gaps are small enough to allow an extremely small amount of movement in the event the carrier segment 26 moves circumferentially before being stopped by one of the extension surfaces 70, 76. In some embodiments, no gap exists between the first and second circumferential ends 83B, 83C of the anti-rotation platform 80 rest against the first and second circumferential walls 52A, 52B of the anti-rotation recess 52.

The positioning of the locating plate 34 relative to the carrier segment 26 as shown in FIG. 6 enables the locating plate 34 to block circumferential movement of the carrier segment 26 relative to the locating plate 34 in response to circumferential forces acting on the carrier segment 26. Moreover, the locating plate 34 blocks axially forward movement of the carrier segment 26 and prevents separation of the hangers 28A, 28B from the turbine case 23 in response to axially forward forces acting on the carrier segment 26.

A method according to the present disclosure includes a first operational step of arranging a turbine case 23 circumferentially around an axis 11. The method may further include a second operational step of arranging a vane assembly 88 circumferentially at least partway around the axis 11 and radially inwardly of the turbine case 23, the vane assembly 88 including a first vane 89 and an outer platform 91 arranged on a radially outer end of the first vane 88, the outer platform 91 including a first anti-rotation protrusion 92, 95 extending radially away from a radially outwardly-facing surface 91B1 of the outer platform 91.

The method may further include a third operational step of arranging a locating plate 34 circumferentially at least partway around the axis 11 and coupling the locating plate 34 with the turbine case 23 radially outward of the vane assembly 88. The locating plate 34 includes a main wall 36, a first anti-rotation extension 68 extending radially inwardly away from an aft end 41A of the main wall 36, and a second anti-rotation extension 74 extending radially inwardly away from the aft end 41A of the main wall 36 and circumferentially spaced apart from the first anti-rotation extension 68. The method may further include a fourth operational step of engaging the first anti-rotation protrusion 92, 95 of the vane assembly 88 with one of the first anti-rotation extension 68 and the second anti-rotation extension 74 of the locating plate 34 so as to block circumferential movement of the vane assembly 88 relative to the locating plate 34.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly for use with a gas turbine engine, the turbine assembly comprising a turbine case arranged circumferentially around an axis, a vane assembly arranged circumferentially at least partway around the axis and arranged radially inwardly of the turbine case, the vane assembly including a first vane and an outer platform arranged on a radially outer end of the first vane, the outer platform including a first anti-rotation protrusion extending radially outwardly away from a radially outwardly-facing surface of the outer platform, and a locating plate arranged circumferentially at least partway around the axis and coupled with the turbine case radially outward of the vane assembly, the locating plate including a main wall, a first anti-rotation extension extending radially inwardly away from an aft end of the main wall, and a second anti-rotation extension extending radially inwardly away from the aft end of the main wall and circumferentially spaced apart from the first anti-rotation extension, wherein the first anti-rotation protrusion of the vane assembly is arranged to engage with one of the first anti-rotation extension and the second anti-rotation extension of the locating plate so as to block circumferential movement of the vane assembly relative to the locating plate.

2. The turbine assembly of claim 1, wherein the locating plate extends partway circumferentially around the axis, wherein the main wall includes a first circumferential side and second circumferential side circumferentially opposite the first circumferential side, and wherein the aft end of the main wall extends between the first circumferential side and the second circumferential side.

3. The turbine assembly of claim 2, wherein the vane assembly further includes a second anti-rotation protrusion circumferentially spaced apart from the first anti-rotation protrusion.

4. The turbine assembly of claim 3, wherein the first anti-rotation extension includes a first extension surface that faces a first circumferential direction and the first anti-rotation protrusion includes a first protrusion surface that faces a second circumferential direction opposite the first circumferential direction, and wherein the first extension surface is configured to contact the first protrusion surface so as to block circumferential movement of the vane assembly relative to the locating plate in response to circumferential forces acting on the vane assembly.

5. The turbine assembly of claim 4, wherein the second anti-rotation extension includes a second extension surface that faces the second circumferential direction and the second anti-rotation protrusion includes a second protrusion surface that faces the first circumferential direction, and wherein the second extension surface is configured to contact the second protrusion surface so as to further block circumferential movement of the vane assembly relative to the locating plate in response to circumferential forces acting on the vane assembly.

6. The turbine assembly of claim 5, wherein the first extension surface faces away from the second extension surface and the first protrusion surface faces the second protrusion surface.

7. The turbine assembly of claim 3, wherein the outer platform of the vane assembly includes a main platform and a first flange extending radially outwardly from an aft end of the main platform, and wherein the first and second anti-rotation protrusions are arranged on the first flange.

8. The turbine assembly of claim 2, further comprising:

a turbine shroud assembly coupled with the turbine case to define a portion of a gas path of the turbine assembly, the turbine shroud assembly including a carrier segment and a blade track segment, the carrier segment being made of metallic materials and arranged circumferentially at least partway around the axis, the carrier segment including an outer wall and a hanger extending from the outer wall and supported on the turbine case to couple the carrier segment to the turbine case, wherein the locating plate is arranged axially forward of the carrier segment to block axially forward movement of the carrier segment and prevent separation of the hanger from the turbine case.

9. The turbine assembly of claim 8, wherein the carrier segment further includes an anti-rotation platform extending axially away from a forward-facing surface of the outer wall, wherein the locating plate further includes an anti-rotation recess formed in the main wall of the locating plate, and wherein the anti-rotation recess is configured to receive the anti-rotation platform to block axially forward movement of the carrier segment and prevent separation of the hanger from the turbine case.

10. The turbine assembly of claim 9, wherein the anti-rotation recess is defined by an axially forward wall, a first circumferential wall, and a second circumferential wall opposite the first circumferential wall, and wherein a first circumferential end of the anti-rotation platform of the carrier segment and a second circumferential end of the anti-rotation platform opposite the first circumferential end are configured to engage with the first and second circumferential walls, respectively, so as to block circumferential movement of the carrier segment relative to the locating plate.

11. The turbine assembly of claim 10, wherein the anti-rotation recess further includes a first peg extending radially upwardly from a bottom surface of the anti-rotation recess, wherein the anti-rotation platform includes a first slot formed therein, and wherein the first peg is arranged within the first slot so as to secure the anti-rotation platform within the anti-rotation recess.

12. The turbine assembly of claim 11, wherein the first slot includes a stadium shape and includes a length that is greater than a diameter of the first peg and a width that is generally equal to the diameter of the first peg so as to allow for circumferential movement of the first peg within the first slot and not allow for axial movement of the first peg within the first slot.

13. A turbine assembly for use with a gas turbine engine, the turbine assembly comprising a turbine case arranged circumferentially around an axis, a vane assembly arranged radially inwardly of the turbine case and including a first vane and an outer platform having a first anti-rotation protrusion extending radially outwardly away from a radially outwardly-facing surface of the outer platform, and a locating plate coupled with the turbine case radially outward of the vane assembly, the locating plate including a main wall, a first anti-rotation extension extending radially inwardly away from an aft end of the main wall, wherein a circumferentially facing surface of the first anti-rotation protrusion of the vane assembly is arranged to engage with and contact a circumferentially facing surface of the first anti-rotation extension of the locating plate so as to block circumferential movement of the vane assembly relative to the locating plate.

14. The turbine assembly of claim 13, wherein the locating plate further includes a second anti-rotation extension extending radially inwardly away from the aft end of the main wall and circumferentially spaced apart from the first anti-rotation extension, wherein the vane assembly further includes a second anti-rotation protrusion circumferentially spaced apart from the first anti-rotation protrusion, and wherein the second anti-rotation protrusion of the vane assembly is arranged to engage with the second anti-rotation extension of the locating plate so as to further block circumferential movement of the vane assembly relative to the locating plate.

15. The turbine assembly of claim 14, wherein the outer platform of the vane assembly includes a main platform and a first flange extending radially outwardly from an aft end of the main platform, and wherein the first and second anti-rotation protrusions are arranged on the first flange.

16. The turbine assembly of claim 13, further comprising:

a turbine shroud assembly coupled with the turbine case and including a carrier segment and a blade track segment, the carrier segment including an outer wall and a hanger extending from the outer wall and supported on the turbine case to couple the carrier segment to the turbine case, wherein the locating plate is arranged axially forward of the carrier segment to block axially forward movement of the carrier segment and prevent separation of the hanger from the turbine case.

17. The turbine assembly of claim 16, wherein the carrier segment further includes an anti-rotation platform extending axially away from a forward-facing surface of the outer wall, wherein the locating plate further includes an anti-rotation recess formed in the main wall of the locating plate, and wherein the anti-rotation recess is configured to receive the anti-rotation platform to block axially forward movement of the carrier segment and prevent separation of the hanger from the turbine case.

18. The turbine assembly of claim 17, wherein the anti-rotation recess is defined by an axially forward wall, a first circumferential wall, and a second circumferential wall opposite the first circumferential wall, and wherein a first circumferential end of the anti-rotation platform of the carrier segment and a second circumferential end of the anti-rotation platform opposite the first circumferential end are configured to engage with the first and second circumferential walls, respectively, so as to block circumferential movement of the carrier segment relative to the locating plate.

19. The turbine assembly of claim 18, wherein the anti-rotation recess further includes a first peg extending radially upwardly from a bottom surface of the anti-rotation recess, wherein the anti-rotation platform includes a first slot formed therein, and wherein the first peg is arranged within the first slot so as to secure the anti-rotation platform within the anti-rotation recess.

20. A method comprising arranging a turbine case circumferentially around an axis, arranging a vane assembly circumferentially at least partway around the axis and radially inwardly of the turbine case, the vane assembly including a first vane and an outer platform arranged on a radially outer end of the first vane, the outer platform including a first anti-rotation protrusion extending radially outwardly away from a radially outwardly-facing surface of the outer platform, arranging a locating plate circumferentially at least partway around the axis and coupling the locating plate with the turbine case radially outward of the vane assembly, the locating plate including a main wall, a first anti-rotation extension extending radially inwardly away from an aft end of the main wall, and a second anti-rotation extension extending radially inwardly away from the aft end of the main wall and circumferentially spaced apart from the first anti-rotation extension, engaging the first anti-rotation protrusion of the vane assembly with one of the first anti-rotation extension and the second anti-rotation extension of the locating plate so as to block circumferential movement of the vane assembly relative to the locating plate.

* * * * *